United States Patent
Munoz Delgado et al.

(10) Patent No.: US 12,536,339 B2
(45) Date of Patent: Jan. 27, 2026

(54) DEVICE AND METHOD FOR DETERMINING ADVERSARIAL PATCHES FOR A MACHINE LEARNING SYSTEM

(71) Applicant: Robert Bosch GmbH, Stuttgart (DE)

(72) Inventors: Andres Mauricio Munoz Delgado, Weil der Stadt (DE); Chaithanya Kumar Mummadi, Pittsburgh, PA (US); Giulio Lovisotto, Munich (DE); Jan Hendrik Metzen, Boeblingen (DE); Nicole Ying Finnie, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 18/163,681

(22) Filed: Feb. 2, 2023

(65) Prior Publication Data

US 2023/0259658 A1    Aug. 17, 2023

(30) Foreign Application Priority Data

Feb. 11, 2022    (EP) .................................... 22156419

(51) Int. Cl.
*G06F 21/64*    (2013.01)
*G06N 3/094*    (2023.01)

(52) U.S. Cl.
CPC ............. *G06F 21/64* (2013.01); *G06N 3/094* (2023.01)

(58) Field of Classification Search
CPC ....... G06F 21/64; G06F 21/577; G06N 3/094; G06N 20/00; G06N 3/08; G06V 10/22; G06V 10/273; G06V 10/473; G06V 10/761; G06V 10/766
See application file for complete search history.

(56) References Cited

U.S. PATENT DOCUMENTS

2024/0005173 A1*    1/2024    Lomuscio ................ G06N 3/10

OTHER PUBLICATIONS

Gu et al., "Are Vision Transformers Robust to Patch Perturbations?," Cornell University, 2021, pp. 1-12.
Vaswani et al., "Attention is All You Need," 31ST Conference on Neural Information Processing Systems (NIPS 2017), 2017, pp. 1-15.
Anonymous Authors, "Patch-Fool: Are Vision Transformers Always Robust Against Adversarial Perturbations?," International Conference on Learning Representations, 2022, pp. 1-18.

* cited by examiner

*Primary Examiner* — Paul E Callahan
(74) *Attorney, Agent, or Firm* — Norton Rose Fulbright US LLP

(57) ABSTRACT

A computer-implemented method for determining an adversarial patch for a machine learning system. The machine learning system is configured for image analysis and determines an output signal based on an input image. The output signal is determined based on an output of an attention layer of the machine learning system. The adversarial patch is determined by optimizing the adversarial patch with respect to a loss function, wherein the loss function comprises a term that characterizes a sum of attention weights of the attention layer with respect to a position of the adversarial patch in the input image and the method comprises a step of maximizing the term.

11 Claims, 9 Drawing Sheets

DEVICE AND METHOD FOR DETERMINING ADVERSARIAL PATCHES FOR A MACHINE LEARNING SYSTEM

CROSS REFERENCE

The present application claims the benefit under 35 U.S.C. § 119 of European Patent Application No. EP 22 15 6419.8 filed on Feb. 11, 2022, which is expressly incorporated herein by reference in its entirety.

FIELD

The present invention concerns a method for determining an adversarial patch, a method for determining a control signal of an actuator, a computer program, and a machine-readable storage device.

BACKGROUND INFORMATION

Gu et al. 2021 "Are Vision Transformers Robust to Patch Perturbations?", https://arxiv.org/pdf/2111.10659v1.pdf describes a method for determining adversarial patches for vision transformers.

Machine learning systems based on attention mechanisms find increased usage in almost all fields of technology. Especially when performing image analysis, neural network architectures such as vision transformers have recently shown high predictive performances. Their main benefit is that attention allows reasoning about all parts of a scene captured by an image jointly.

As with other machine learning systems, machine learning systems relying on attention mechanisms are also prone to adversarial patches. Adversarial patches may be understood as perturbations that are overlayed at a certain region of an image in order to fool the machine learning system when processing the overlayed image, e.g., to misclassify the image.

Determining adversarial patches for a given machine learning systems is hence an important problem to be solved as the adversarial patches guide the user of the machine learning system in mitigating impacts of the adversarial patches on the machine learning system.

SUMMARY

An advantage of the method with features of the present invention is that adversarial patches can be determined that are tailored to machine learning systems using attention mechanisms. This way, adversarial patches can be obtained which are better at fooling the machine learning system, i.e., images overlayed by these adversarial patches are harder to classify correctly by the machine learning system. Having determined such harder adversarial patches allows the user to defend the machine learning system even better against adversarial patches.

In a first aspect, the present invention concerns a computer-implemented method for determining an adversarial patch for a machine learning system (60), wherein the machine learning system (60) is configured for image analysis and determines an output signal (y, $y_i$) based on an input image (x, $x_i$), wherein the output signal (y, $y_i$) is determined based on an output of an attention layer (61) of the machine learning system (60), wherein the adversarial patch is determined by optimizing the adversarial patch with respect to a loss function, wherein the loss function comprises a term ($\mathcal{L}_{kq}^1$, $\mathcal{L}_{kq}^2$, $\mathcal{L}_{kq}^3$) that characterizes a sum of attention weights of the attention layer (61) with respect to a position of the adversarial patch in the input image (x, $x_i$) and the method comprises a step of maximizing the term.

The machine learning system may especially be understood as a neural network comprising a plurality of layers, wherein at least one of the layers is an attention layer, e.g., a self-attention layer. The machine learning system is configured to process images and determine a prediction about the input image, e.g., perform a classification (e.g., single label classification, multi-label classification, object detection, semantic segmentation) of the perform or perform a regression analysis based on the input image, i.e., determine at least one real value characterizing the input image.

The machine learning system being configured for image analysis may be understood as the machine learning system being trained to analyze images.

The input image may be recorded by any suitable optical sensor, e.g., a camera, a LIDAR sensor, a radar sensor, an ultrasonic, or a thermal camera. The input image, may, however, also be determined synthetically, e.g., generated by a machine learning model such as a generative adversarial network, an autoencoder, or a normalizing flow. The input image may also be synthesized from a computer simulation, e.g., be a rendered image from a virtual world.

The adversarial patch may be understood as a preferably smaller image than the input image, wherein the adversarial patch may be applied to the image. Application of an adversarial patch to an image may especially be understood as replacing pixels of the image at a certain region of the image with the pixels of the adversarial patch, wherein the region has the same size as the adversarial patch. This may also be understood as overlaying the image with the adversarial patch. Alternatively, it is also possible to alter the pixels in the region based on pixels of the adversarial patch, e.g., by blending the adversarial patch into the image using a predefined blending factor.

Determining the adversarial patch may be understood as optimizing the adversarial patch with the goal to best fool the machine learning system into a wrong analysis of a plurality of input images, e.g., misclassify all input images from a dataset of input images. The adversarial patch may especially be optimized such that a position of the adversarial patch in the image is irrelevant when fooling the machine learning system.

Advantageously, the method respects the unique traits of the attention layer, namely its attention weights, in the machine learning system in order to determine the adversarial patch such that it is even more capable of fooling the machine learning system compared to other approaches. This gives a better understanding of the machine learning and guides a user of the machine learning system to harden the machine learning system even better against adversarial attacks.

According to an example embodiment of the present invention, given the input image, e.g., as mathematically formulated by $x_i \in [0, 1]^{3 \times h \times w}$ and associated label $y_i$, an adversarial patch $p \in [0, 1]^{3 \times ph \times pw}$ with ph<<h, pw<<w may be determined by maximizing the following objective:

$$\arg\max_p \mathcal{L}(f(\mathcal{F}(x_i, p, L)), t_i),$$

with L specifying the location of the patch p within the larger input image $x_i$, $\mathcal{F}$ is a function to apply the patch onto the input image (e.g., overwriting an input region for a given size), and $f$ being the machine learning system.

For the optimization, projected gradient descent for $l_\infty$-norm bound perturbations may be used according to the formula:

$$p^{t+1} = p^t + \alpha \cdot \text{sgn}(\Lambda_p \mathcal{L}(f(\mathcal{F}_{(x_i,p,L)},t_i)).$$

$p_0$ may especially be initialized uniform randomly from $[0, 1]^{3 \times ph \times pw}$.

The input image may be processed by a plurality of layers of the machine learning system to determine an input of the attention layer or the input image may be used directly as input to the attention layer. The attention layer preferably processes the input of the attention layer by applying a dot-product attention. Dot-product attention may be understood as computing, for every query, attention weights as the dot-product of the query to all keys. The softmax function is then applied over the key dimension. These attention weights are then multiplied by the values according to the formula:

$$\text{Attention}(Q,K,V) = \text{softmax}(QK^T)V$$

Here, $Q \in \mathbb{R}^{n \times d}$, $K \in \mathbb{R}^{n \times d}$, and $V \in \mathbb{R}^{n \times d}$ are matrices of n queries, keys, and values, respectively. Typically, the dot product in the softmax operation may be scaled by $1/\sqrt{d}$ as it was found that the softmax is otherwise pushed into a regime of saturated gradients thus making it hard to train the machine learning system comprising the attention layer. In practice, using multiple attention heads by linearly projecting queries, keys, and values H times to $d_k$, $d_k$, and $d_v$ dimensions were found to be beneficial. The output of the h-th attention head (AH) can be determined according to:

$$AH_h(Q, K, V) = \text{softmax}\left(\frac{QW_Q^h(KW_K^h)^T}{\sqrt{d_k}}\right)VW_V^h,$$

where $W_Q^h \in \mathbb{R}^{d \times d_k}$, $W_K^h \in \mathbb{R}^{d \times d_k}$, $W_V^h \in \mathbb{R}^{d \times d_v}$ are (learnable) projection matrices of the attention layer. The outputs of individual attention heads may then be concatenated and multiplied by another learned projection matrix of the attention layer. A special case is self-attention with $Q=K=V \in \mathbb{R}^{n \times d}$, which is typically used in encoder layers of image recognition models. The attention weights of the h-th head on input X of the attention layer may then be defined according to the formula $$A_h(X) = \text{softmax}\left(\frac{QW_Q^h(KW_K^h)^T}{\sqrt{d_k}}\right).$$

The h-th self-attention head can then be represented by the formula:

$$\text{SelfAH}_h(X) = A_h(X)XW_V^h.$$

The inventors found out that one can approximate $\nabla_X \text{SelfAH}_h(X) \approx (A_h(X)1_X)W_V^h$, that is the gradient considers the attention weights $A_h(X)$ as effectively constant. Accordingly, gradient-based attacks such as PGD based on an end-to-end loss such as disclosed by conventional methods are biased towards focusing on adversarial effects in X that can be propagated (linearly) via the values $V=XW_V^h$ self-attention, while effectively ignoring potentially adverse (and non-linear) effects of X propagated via the attention weights $A_h(X)$. Therefore, it is proposed to target the attention weights by the method as this gives additional insight into potential adverse inputs for the machine learning model.

The inventors further found that the determining adversarial examples according to loss functions based on the attention weights before the softmax function, i.e., loss functions based on $$B_h(X) = \frac{XW_Q^h(XW_K^h)^T}{\sqrt{d}}.$$

Using a different notation that will be used in the following also, the formula can also be written as $$B^{hl} = \frac{P_Q^{hl}(P_K^{hl})^T}{\sqrt{d}},$$

Wherein $B^{hl}$ indicates an output of the h-th head of the attention layer indexed by l, $P_Q^{hl}$ indicates the projected queries determined in the h-th head of the attention layer and $P_K^{hl}$ indicates the projected queries determined in the h-th head of the attention layer. The output $B^{hl}$ may be understood as matrix. In other words, each element of $B^{hl}$ may be understood as quantifying the dot-product similarity between a key and a query in the respective attention head h and of the attention layer with index l.

In preferred example embodiments of the method of the present invention, the term that is part of the loss function for optimizing the adversarial patch is characterized by the formula:

$$\mathcal{L}_{kq}^{hl} = \frac{1}{n}\sum_j B_{ji^*}^{hl},$$

wherein n is the sequence length of the sequence provided to the attention layer l and $$B_{ji^*}^{hl}$$

indicates the attention weight of an element j of the sequence with respect to an element i* of the sequence before the application of the softmax function. This may also be understood as attention weight logits. In terms of common language associated with transformers and vision transformers, the sequence elements may be understood as tokens, e.g., feature representations of patches of the input image of the machine learning system. The i*—the token can preferably be chosen to be the token corresponding to a patch in the input image onto which the adversarial patch was applied. By maximizing $\mathcal{L}_{kq}^{hl}$ as part of the loss for optimizing the adversarial patch, this advantageously leads to the attention head to focus all attention weights onto the patch comprising the adversarial patch. In other words, the term $\mathcal{L}_{kq}^{hl}$ characterizes a sum of attention weights of the attention layer l with respect to a position of the adversarial patch in the input image.

In preferred embodiments of the present invention, it is further possible that the attention layer comprises a plurality of heads, wherein each head comprises attention weights and a term that characterizes a sum of attention weights of the attention layer with respect to a position of the adversarial patch in the input image is maximized for each head of the attention layer.

In other words, the term $\mathcal{L}_{kq}^{hl}$ may be determined for each head (also referred to as attention head) separately and each term may then be maximized. It is possible to simply sum up the individual terms in the loss function for maximizing the individual terms.

However, it is also possible that maximizing the term $\mathcal{L}_{kq}^{hl}$ for each head is achieved by maximizing a loss function characterized by the formula $$\mathcal{L}_{kq}^{l} = \log \sum_{h} e^{\mathcal{L}_{kq}^{hl}},$$

i.e., perform a log sum exp (also known as multivariable softplus) operation with respect to the different terms $\mathcal{L}_{kq}^{hl}$. The inventors found the log sum exp operation to result in stronger adversarial patches and subsequently a better understanding of the machine learning system and its weaknesses.

The different terms $\mathcal{L}_{kq}^{hl}$ may have different scales, which may result in one term domination the others during optimizing. In order to advantageously mitigate this and have all heads directed to the query patch, it is also possible to normalize the different terms. Preferably, normalization may be achieved by dividing the projected queries and projected keys by a norm of the projected queries and the projected keys respectively before determining the different terms. Preferably, an $L_{1,2}$-norm may be chosen for normalization. The $L_{1,2}$-norm may be characterized by the formula $$\|X\|_{1,2} = \sum_{i}^{n} \sqrt{\sum_{j}^{d} X_{i,j}^2}.$$

In preferred embodiments of the present invention, it is also possible that the machine learning system comprises a plurality of attention layers and for each attention layer a term that characterizes a sum of attention weights of the attention layer with respect to a position of the adversarial patch in the input image is maximized.

For determining the adversarial patch, it is especially possible that for each attention layer the value $\mathcal{L}_{hq}^{i}$ is determined and that the different values $\mathcal{L}_{hq}^{i}$ are summed up to form part of the loss function used for optimizing the adversarial patch. The authors found that combination of the different values $\mathcal{L}_{hq}^{i}$ can preferably achieved by a log sum exp operation. Advantageously, this leads to stronger adversarial patches and thus a better understanding of the machine learning model. The log sum exp operation can be characterized by the formula $$\mathcal{L}_{kq} = \log \sum_{l} e^{\mathcal{L}_{kq}^{l}}.$$

For optimization, the loss term $\mathcal{L}_{kq}$ may be added to a loss term such as a cross entropy loss term for obtaining the loss function to be optimized.

Having determined an adversarial patch, the user advantageously gets an insight into what patterns are suitable for fooling the machine learning model. Additionally, the determined adversarial patch may be used further to harden the machine learning model against adversarial attacks. In preferred embodiments, the method hence comprises a further step of mitigating an influence of the determined adversarial patch on the machine learning system.

The mitigation step, for example, involve augmenting the machine learning system with additional measures such as an uncertainty detection that determines, based on the determined adversarial patch, whether a classification of the machine learning system can be trusted or not. Thus the output of the machine learning system has knowledge about the appearance of adversarial examples and can be adapted accordingly.

According to an example embodiment of the present invention, preferably, mitigating the influence of the adversarial patch on the machine learning system is achieved by adversarial training.

Adversarial training may be understood as a min-max optimization problem, wherein determining the adversarial patch can be understood as the inner maximization problem. The determined adversarial patch is then used as training sample in combination with an annotation, e.g., a classification or a desired result of a regression analysis, of the input image for training the machine learning model, wherein training may be understood as the outer minimization problem (i.e., a loss with respect to the classification and/or regression result is minimized). This advantageously allows for improving the robustness of the machine learning model against attacks using adversarial patches and as a consequence improves the predictive performance of the machine learning model.

In another aspect, the present invention relates to a computer-implemented method for determining a control signal for an actuator of a technical system, wherein the method comprises mitigating an influence of an adversarial patch on a machine learning system according to an above-described mitigation approach and determining the control signal is based on an output of the machine learning system.

Advantageously, this allows for determining a better control signal for controlling the technical system.

BRIEF DESCRIPTION OF THE DRAWINGS

Example embodiments of the present invention will be discussed with reference to the figures in more detail.

DETAILED DESCRIPTION OF EXAMPLE EMBODIMENTS

Figure 1:
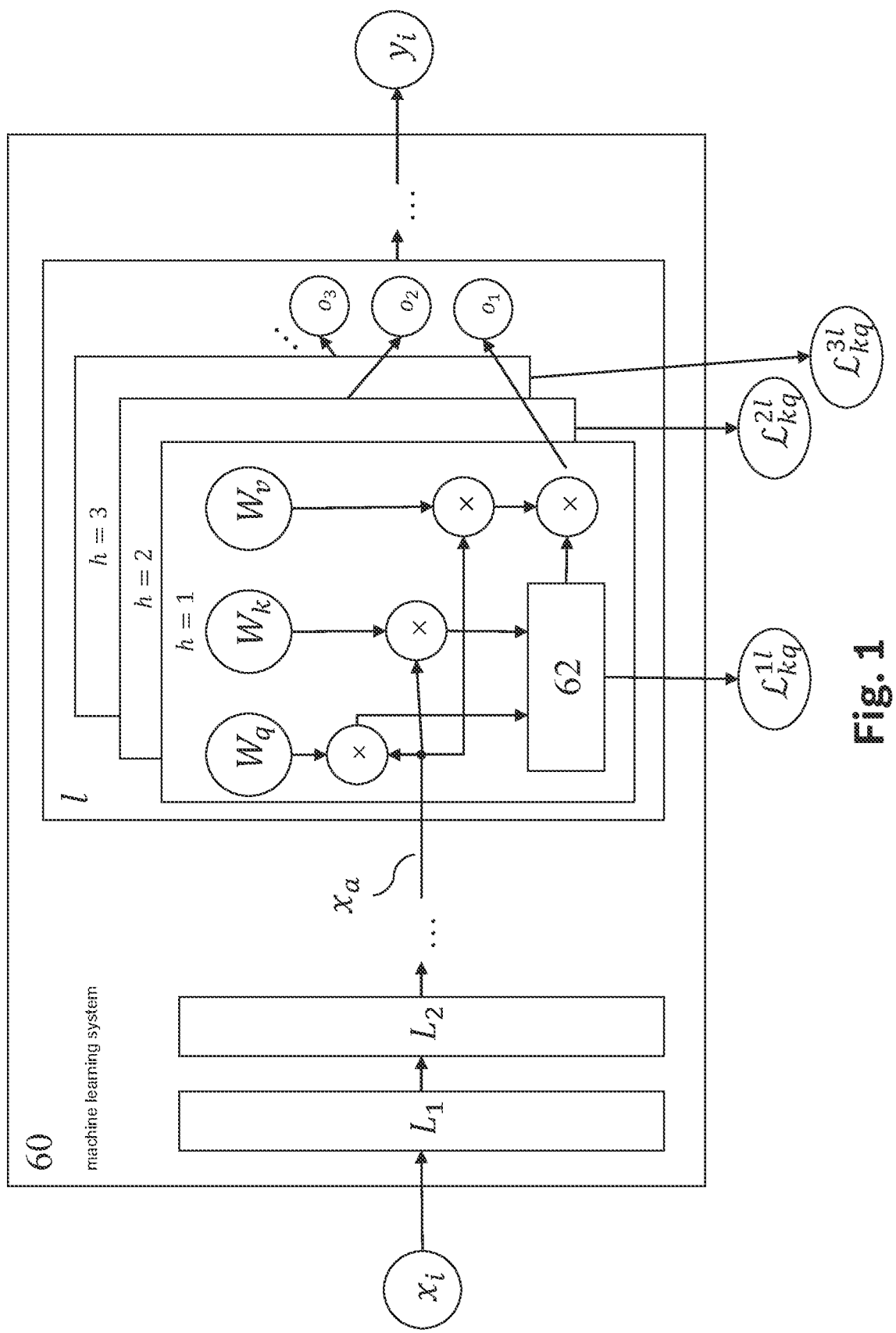
FIG. 1 shows a machine learning system comprising an attention layer, according to an example embodiment of the present invention.

FIG. 1 shows a machine learning system (60) comprising a plurality of layers ($L_1$, $L_2$, l), wherein at least one of the layers is an attention layer (61). The machine learning system (60) is configured to process an input image ($x_i$) and may be understood as a neural network (60). In the shown embodiment the attention layer is provided an input ($x_a$) that is an output of another layer of the neural network (60). In other embodiments, the input image ($x_i$) may be split up into patches for which feature representations in form of patch tokens can be extracted, which may then be used as input of the attention layer (l).

The attention layer (l) comprises at least one but preferably a plurality of attention heads (h=1, h=2, h=2), which each is configured to determine an output based on the input (X) of the attention layer (l). The input is multiplied by a query matrix ($W_q$) to determine a query projection, a key matrix ($W_k$) to determine a key projection, and a value matrix ($W_v$) to determine a value projection. Based on the query projection, key projection and value projection, the attention head determines an output ($o_1$, $o_2$, $o_3$) according to the self-attention mechanism known for neural networks. An output ($o_1$, $o_2$, $o_3$) may preferably be determined for each attention head in the attention layer to determine an output of the attention layer. The output of the attention layer may then be processed by other layers of the neural network (60) in order to determine an output signal ($y_i$). In other embodiments (not shown) the output of the attention layer may be used as output signal ($y_i$) directly.

Based on the query projection and the key projection, a loss term unit (62) of the attention head (h=1, h=2, h=3) determines a loss term ($\mathcal{L}_{kq}^{1l}$, $\mathcal{L}_{kq}^{2l}$, $\mathcal{L}_{kq}^{3l}$) according to the formula:

$$\mathcal{L}_{kq}^{hl} = \frac{1}{n}\sum_j B_{ji*}^{hl}.$$

$$B^{hl} = \frac{P_Q^{hl}(P_K^{hl})^T}{\sqrt{d}}.$$

Figure 2:
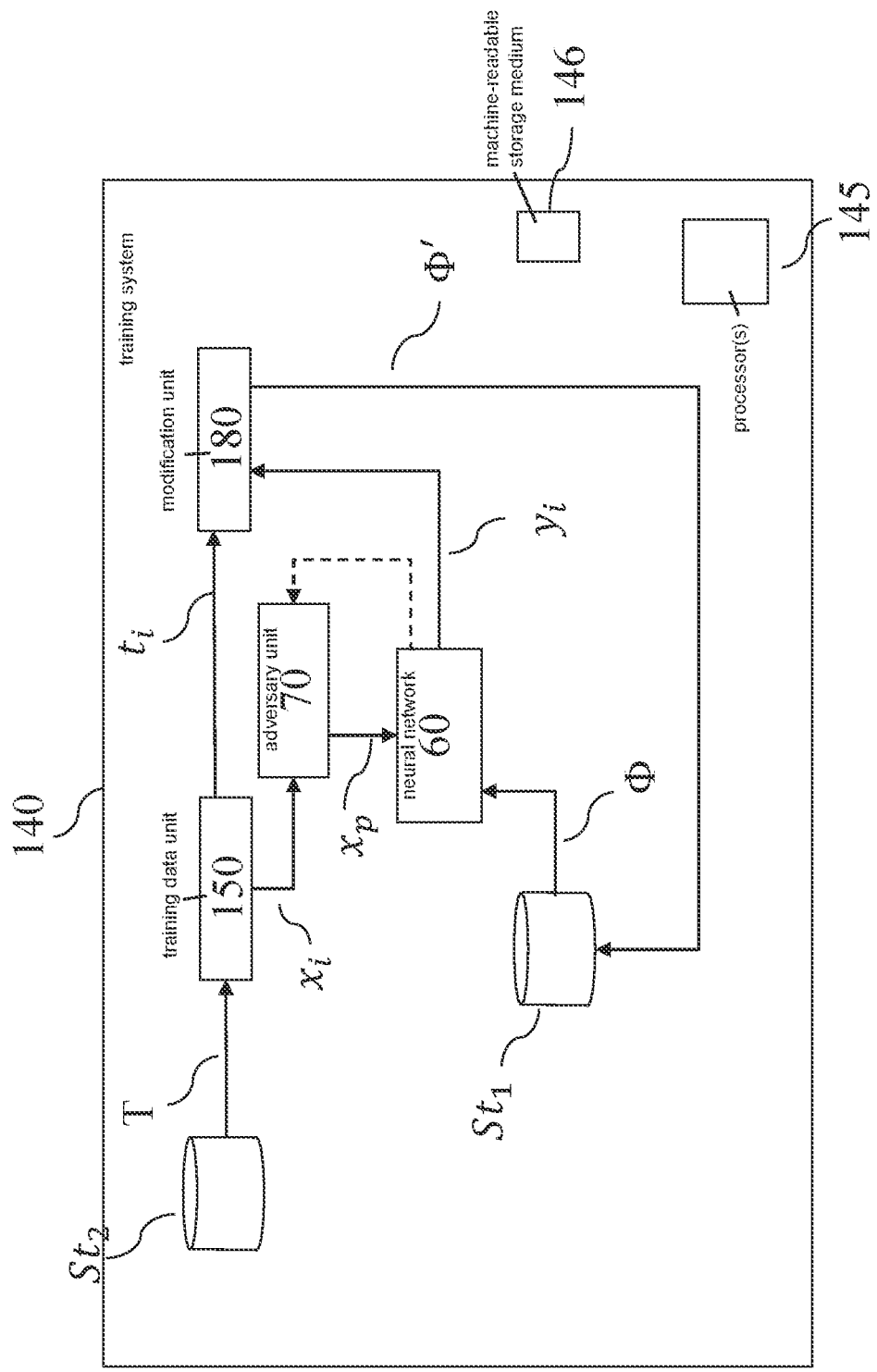
FIG. 2 shows a training system for training the machine learning system, according to an example embodiment of the present invention.

FIG. 2 shows an embodiment of a training system (140) for training the neural network (60) of the control system (40) by means of a training data set (T). The training data set (T) comprises a plurality of input images ($x_i$) which are used for training the classifier (60), wherein the training data set (T) further comprises, for each input image ($x_i$), a desired output signal ($t_i$) which corresponds to the input image ($x_i$) and characterizes a classification and/or desired result of a regression analysis of the input image ($x_i$).

For training, a training data unit (150) accesses a computer-implemented database (St2), the database (St2) providing the training data set (T). The training data unit (150) determines from the training data set (T) preferably randomly at least one input image ($x_i$) and the desired output signal ($t_i$) corresponding to the input signal (x) and transmits the input signal ($x_i$) to an adversary unit (70). The adversary unit (70) is configured to determine an adversarial patch based on the input image ($x_i$) and a parametrization of the neural network (60). The adversary unit (70) preferably determines the adversarial patch by maximizing a loss function $$\mathcal{L} = \mathcal{L}_{ce}(f(\mathcal{F}(x_i, p, L)), t_i) + \mathcal{L}_{kq},$$

$$\mathcal{L}_{kq} = \log\sum_l e^{\mathcal{L}_{kq}^l},$$

$$\mathcal{L}_{kq}^l = \log\sum_h e^{\mathcal{L}_{kq}^{hl}},$$

wherein $\mathcal{L}_{ce}$ is a cross entropy loss. Preferably, maximization is constrained with respect to an adversary model, e.g., by allowing only a certain amount of perturbations in the pixels. This may especially be achieved through projected gradient descent.

Having determined the adversarial patch, the adversary unit (70) applied it to the input image ($x_i$) to determine a patched image ($x_p$). The patched image ($x_p$) is then provided to the neural network (60). The neural network (60) determines an output signal ($y_i$) based on the patched image ($x_i$).

The desired output signal ($t_i$) and the determined output signal ($y_i$) are transmitted to a modification unit (180).

Based on the desired output signal ($t_i$) and the determined output signal ($y_i$), the modification unit (180) then determines new parameters ($\Phi'$) for the neural network (60). For this purpose, the modification unit (180) compares the desired output signal ($t_i$) and the determined output signal ($y_i$) using a loss function. The loss function determines a first loss value that characterizes how far the determined output signal ($y_i$) deviates from the desired output signal ($t_i$). In the given embodiment, a negative log-likelihood function is used as the loss function. Other loss functions are also possible in alternative embodiments.

Furthermore, it is possible that the determined output signal ($y_i$) and the desired output signal ($t_i$) each comprise a plurality of sub-signals, for example in the form of tensors, wherein a sub-signal of the desired output signal ($t_i$) corresponds to a sub-signal of the determined output signal ($y_i$). It is possible, for example, that the neural network (60) is configured for object detection and a first sub-signal characterizes a probability of occurrence of an object with respect to a part of the input signal ($x_i$) and a second sub-signal characterizes the exact position of the object. If the determined output signal ($y_i$) and the desired output signal ($t_i$) comprise a plurality of corresponding sub-signals, a second loss value is preferably determined for each corresponding sub-signal by means of a suitable loss function and the determined second loss values are suitably combined to form the first loss value, for example by means of a weighted sum.

The modification unit (180) determines the new parameters ($\Phi'$) based on the first loss value. In the given embodiment, this is done using a gradient descent method, preferably stochastic gradient descent, Adam, or AdamW. In further embodiments, training may also be based on an evolutionary algorithm or a second-order method for training neural networks.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value.

In at least one of the iterations the new parameters ($\Phi'$) determined in a previous iteration are used as parameters ($\Phi$) of the neural network (60).

Furthermore, the training system (140) may comprise at least one processor (145) and at least one machine-readable storage medium (146) containing instructions which, when executed by the processor (145), cause the training system (140) to execute a training method according to one of the aspects of the present invention.

Figure 3:
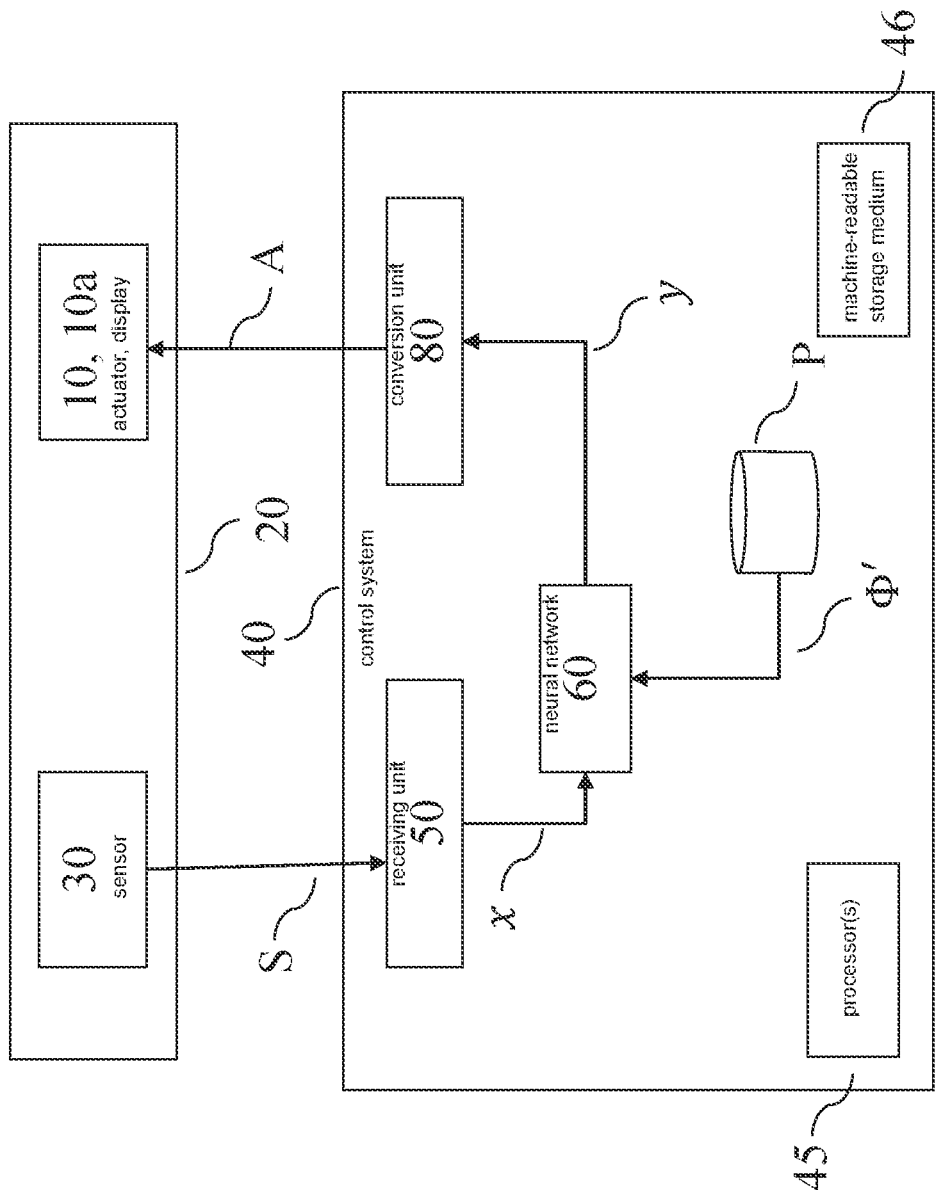
FIG. 3 shows a control system comprising a classifier controlling an actuator in its environment, according to an example embodiment of the present invention.

FIG. 3 shows an embodiment of an actuator (10) in its environment (20). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors.

Preferably, the sensor (30) is an optical sensor that takes images of the environment (20). An output signal (S) of the sensor (30) (or in case the sensor (30) comprises a plurality of sensors, an output signal (S) for each of the sensors) which encodes the sensed condition is transmitted to the control system (40).

Thereby, the control system (40) receives a stream of sensor signals(S). It then computes a series of control signals (A) depending on the stream of sensor signals(S), which are then transmitted to the actuator (10).

The control system (40) receives the stream of sensor signals(S) of the sensor (30) in an optional receiving unit (50). The receiving unit (50) transforms the sensor signals (S) into input images (x). Alternatively, in case of no receiving unit (50), each sensor signal (S) may directly be taken as an input image (x). The input image (x) may, for example, be given as an excerpt from the sensor signal (S). Alternatively, the sensor signal (S) may be processed to yield the input image (x). In other words, the input image (x) is provided in accordance with the sensor signal (S).

The input image (x) is then passed on to the neural network (60) trained according to FIG. 2.

The neural network (60) is parametrized by parameters ($\Phi$), which are stored in and provided by a parameter storage ($St_1$).

The neural network (60) determines an output signal (y) from the input images (x). The output signal (y) comprises information that assigns one or more labels to the input image (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 4:
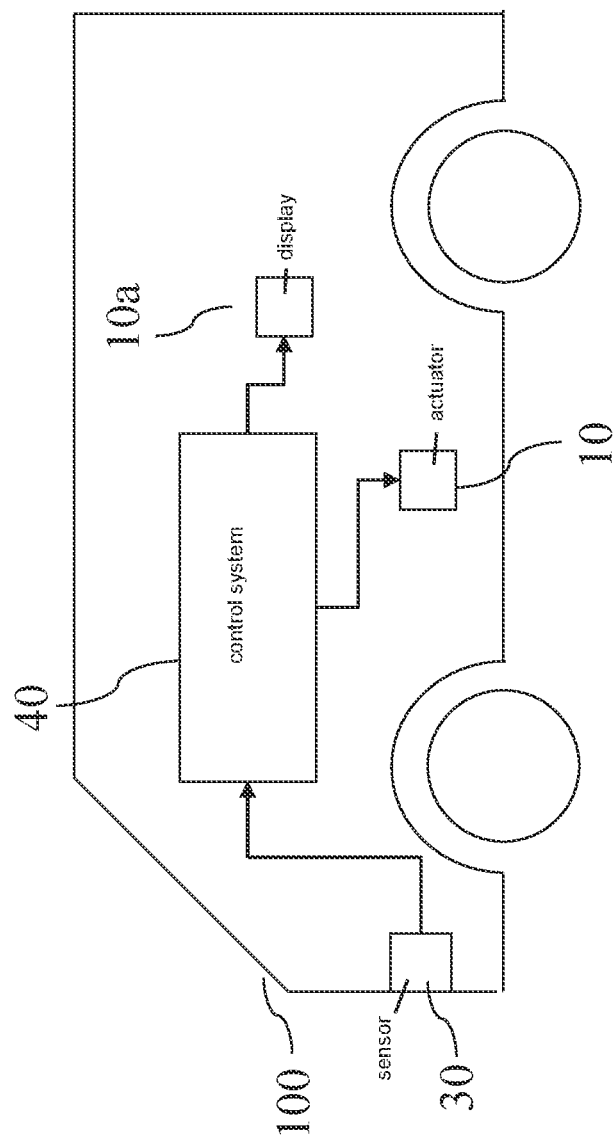
FIG. 4 shows the control system controlling an at least partially autonomous robot, according to an example embodiment of the present invention.

FIG. 4 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100).

The neural network (60) may be configured to detect objects in the vicinity of the at least partially autonomous robot based on the input image (x). The output signal (y) may comprise an information, which characterizes where objects are located in the vicinity of the at least partially autonomous robot. The control signal (A) may then be determined in accordance with this information, for example to avoid collisions with the detected objects.

The actuator (10), which is preferably integrated in the vehicle (100), may be given by a brake, a propulsion system, an engine, a drivetrain, or a steering of the vehicle (100). The control signal (A) may be determined such that the actuator (10) is controlled such that vehicle (100) avoids collisions with the detected objects. The detected objects may also be classified according to what the neural network (60) deems them most likely to be, e.g., pedestrians or trees, and the control signal (A) may be determined depending on the classification.

Alternatively or additionally, the control signal (A) may also be used to control the display (10a), e.g., for displaying the objects detected by the neural network (60). It can also be imagined that the control signal (A) may control the display (10a) such that it produces a warning signal if the vehicle (100) is close to colliding with at least one of the detected objects. The warning signal may be a warning sound and/or a haptic signal, e.g., a vibration of a steering wheel of the vehicle.

In further embodiments, the at least partially autonomous robot may be given by another mobile robot (not shown), which may, for example, move by flying, swimming, diving, or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, a control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 5:
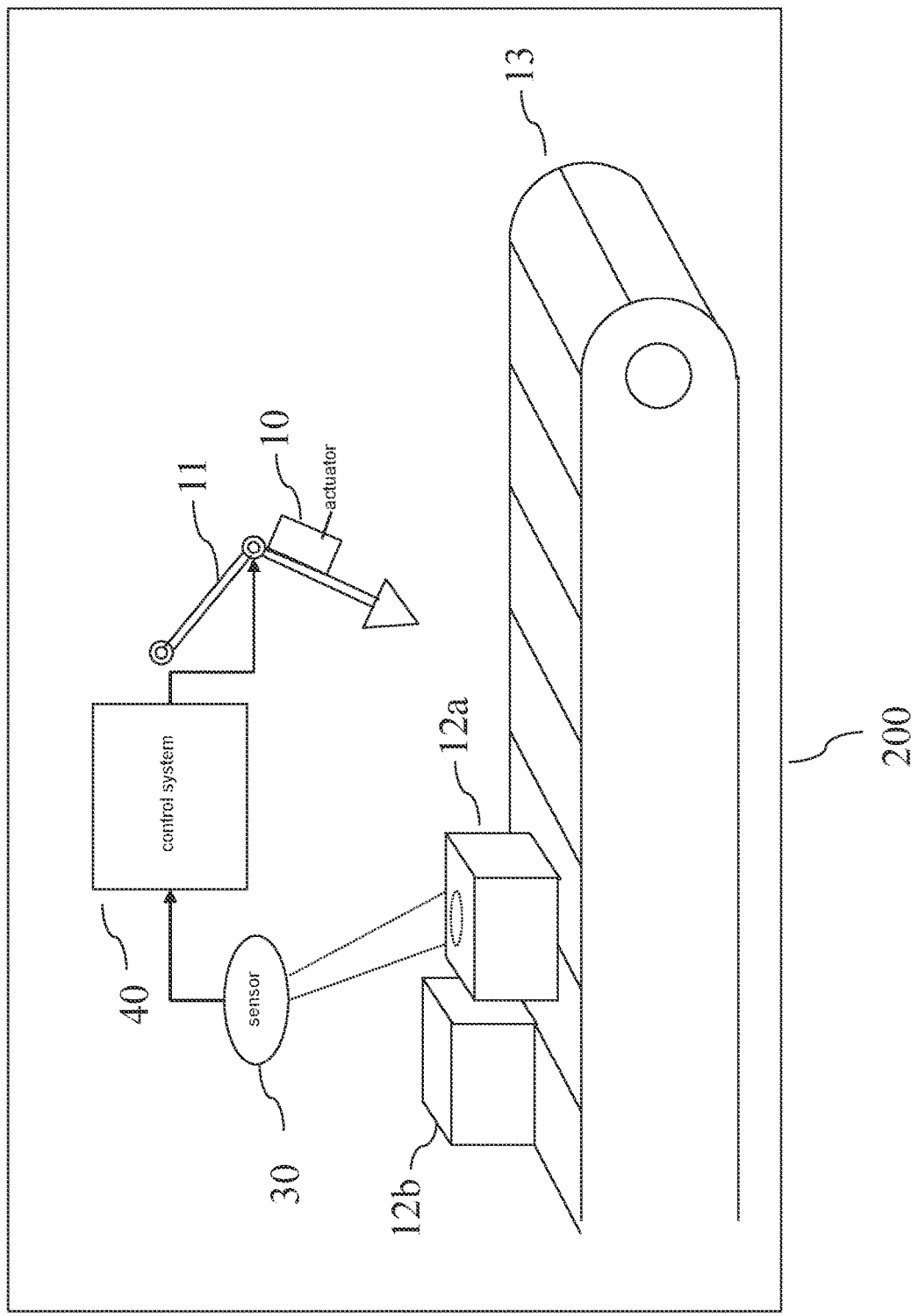
FIG. 5 shows the control system controlling a manufacturing machine, according to an example embodiment of the present invention.

FIG. 5 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12

The neural network (60) may determine a position of the manufactured product (12) with respect to the transportation device. The actuator (10) may then be controlled depending on the determined position of the manufactured product (12) for a subsequent manufacturing step of the manufactured product (12). For example, the actuator (10) may be controlled to cut the manufactured product at a specific location of the manufactured product itself. Alternatively, it may be envisioned that the neural network (60) classifies, whether the manufactured product is broken or exhibits a defect. The actuator (10) may then be controlled as to remove the manufactured product from the transportation device.

Figure 6:
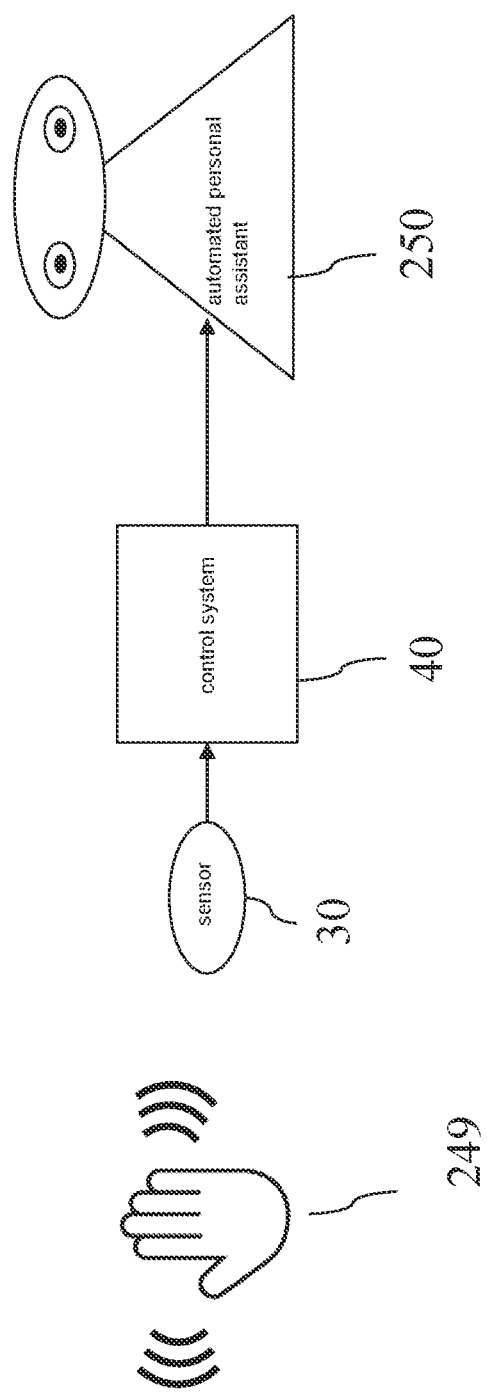
FIG. 6 shows the control system controlling an automated personal assistant, according to an example embodiment of the present invention.

FIG. 6 shows an embodiment in which the control system (40) is used for controlling an automated personal assistant (250). The sensor (30) may be an optic sensor, e.g., for receiving video images of a gestures of a user (249). Alternatively, the sensor (30) may also be an audio sensor, e.g., for receiving a voice command of the user (249).

The control system (40) then determines control signals (A) for controlling the automated personal assistant (250). The control signals (A) are determined in accordance with the sensor signal (S) of the sensor (30). The sensor signal (S) is transmitted to the control system (40). For example, the neural network (60) may be configured to, e.g., carry out a gesture recognition algorithm to identify a gesture made by the user (249). The control system (40) may then determine a control signal (A) for transmission to the automated personal assistant (250). It then transmits the control signal (A) to the automated personal assistant (250).

For example, the control signal (A) may be determined in accordance with the identified user gesture recognized by the neural network (60). It may comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave, or a dishwasher.

Figure 7:
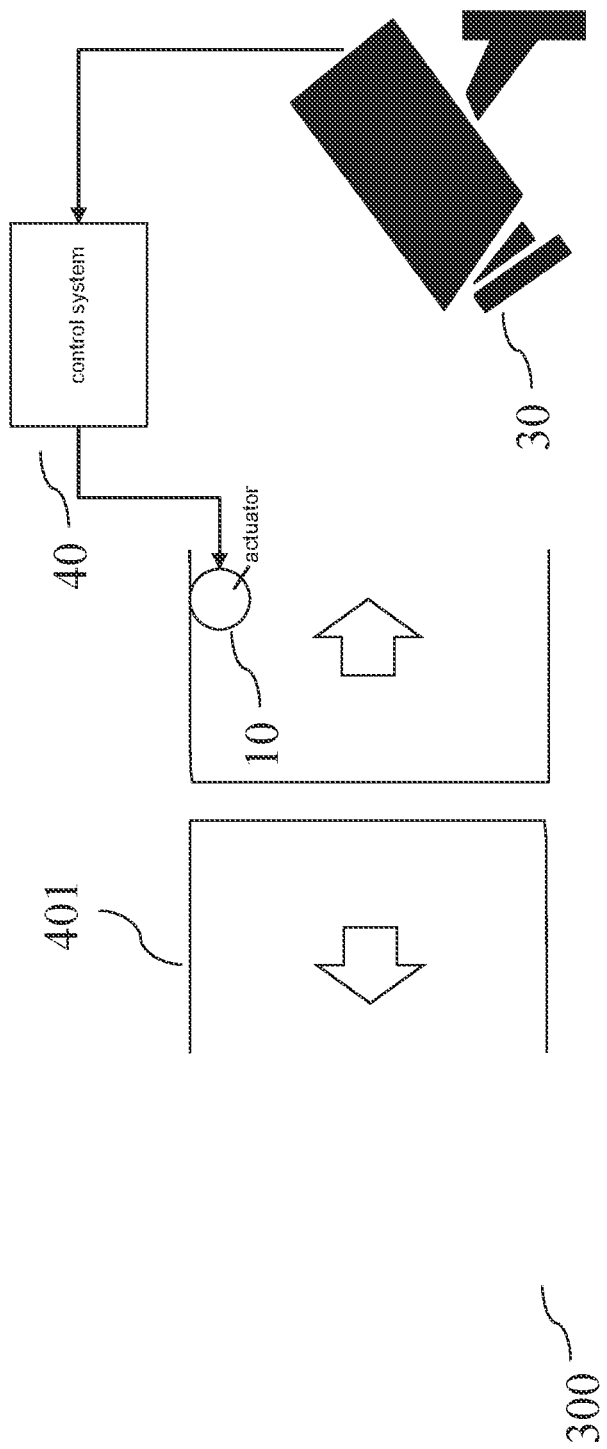
FIG. 7 shows the control system controlling an access control system, according to an example embodiment of the present invention.

FIG. 7 shows an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for detecting a person's face.

The neural network (60) may be configured to classify an identity of the person, e.g., by matching the detected face of the person with other faces of known persons stored in a database, thereby determining an identity of the person. The control signal (A) may then be determined depending on the classification of the neural network (60), e.g., in accordance with the determined identity. The actuator (10) may be a lock which opens or closes the door depending on the control signal (A). Alternatively, the access control system (300) may be a non-physical, logical access control system. In this case, the control signal may be used to control the display (10a) to show information about the person's identity and/or whether the person is to be given access.

Figure 8:
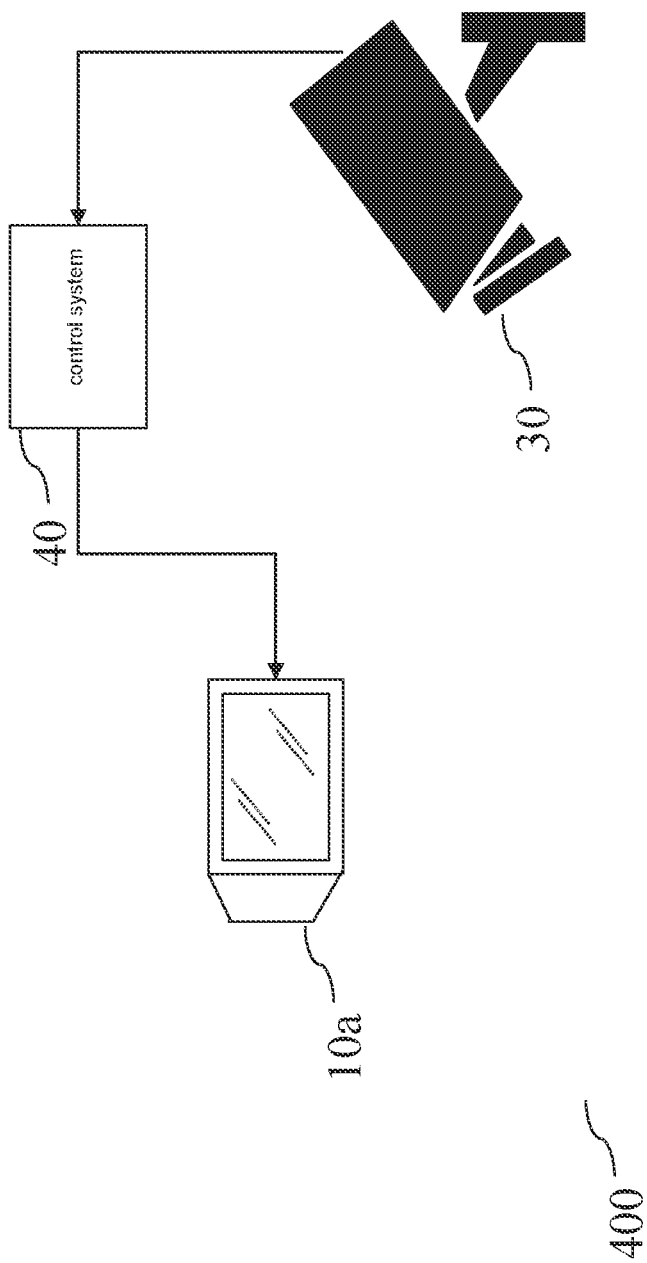
FIG. 8 shows the control system controlling a surveillance system, according to an example embodiment of the present invention.

FIG. 8 shows an embodiment in which the control system (40) controls a surveillance system (400). This embodiment is largely identical to the embodiment shown in FIG. 7. Therefore, only the differing aspects will be described in detail. The sensor (30) is configured to detect a scene that is under surveillance. The control system (40) does not necessarily control an actuator (10) but may alternatively control a display (10a). For example, the image classifier (60) may determine a classification of a scene, e.g., whether the scene detected by an optical sensor (30) is normal or whether the scene exhibits an anomaly. The control signal (A), which is transmitted to the display (10a), may then, for example, be configured to cause the display (10a) to adjust the displayed content dependent on the determined classification, e.g., to highlight an object that is deemed anomalous by the neural network (60).

Figure 9:
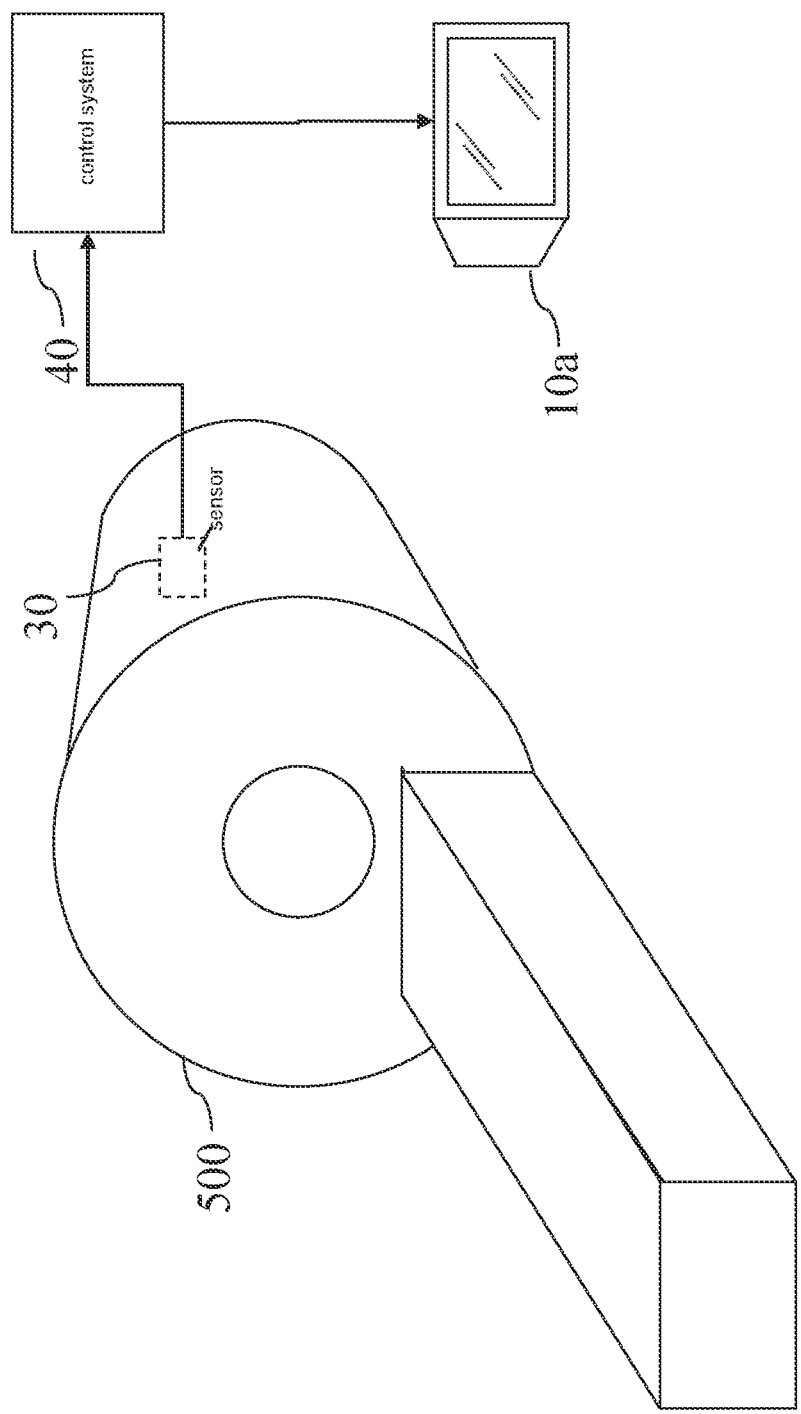
FIG. 9 shows the control system controlling an imaging system, according to an example embodiment of the present invention.

FIG. 9 shows an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The classifier (60) may then determine a classification of at least a part of the sensed image (x).

The control signal (A) may then be chosen in accordance with the classification, thereby controlling a display (10a). For example, the neural network (60) may be configured to detect different types of tissue in the sensed image, e.g., by classifying the tissue displayed in the image into either malignant or benign tissue. This may be done by means of a semantic segmentation of the input image (x) by the neural network (60). The control signal (A) may then be determined to cause the display (10a) to display different tissues, e.g., by displaying the input image (x) and coloring different regions of identical tissue types in a same color.

In further embodiments (not shown) the imaging system (500) may be used for non-medical purposes, e.g., to determine material properties of a workpiece. In these embodiments, the neural network (60) may be configured to receive an input image (x) of at least a part of the workpiece and perform a semantic segmentation of the input image (x), thereby classifying the material properties of the workpiece. The control signal (A) may then be determined to cause the display (10a) to display the input image (x) as well as information about the detected material properties.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for determining an adversarial patch for a machine learning system, wherein the machine learning system is configured for image analysis and determines an output signal based on an input image, wherein the output signal is determined based on an output of an attention layer (l) of the machine learning system, the method comprising:

determining the adversarial patch by optimizing the adversarial patch with respect to a loss function, the loss function including a term ($\mathcal{L}_{kq}^{1l}$, $\mathcal{L}_{kq}^{2l}$, $\mathcal{L}_{kq}^{3l}$) that characterizes a sum of attention weights of the attention layer (l) with respect to a position of the adversarial patch in the input image, and maximizing the term, wherein the term ($\mathcal{L}_{kq}^{1l}$, $\mathcal{L}_{kq}^{2l}$, $\mathcal{L}_{kq}^{3l}$) is characterized by the formula:

$$\mathcal{L}_{kq}^{hl} = \frac{1}{n}\sum_{j} B_{ji^*}^{hl}, \quad B^{hl} = \frac{P_Q^{hl}(P_K^{hl})^T}{\sqrt{d_k}}.$$

2. The method according to claim 1, wherein the attention layer includes a plurality of heads, wherein each head of the heads includes attention weights, and the term ($\mathcal{L}_{kq}^{1l}$, $\mathcal{L}_{kq}^{2l}$, $\mathcal{L}_{kq}^{3l}$) that characterizes the sum of attention weights of the attention layer (l) with respect to the position of the adversarial patch in the input image is maximized for each head of the attention layer (l).

3. The method according to claim 1, wherein the machine learning system includes a plurality of attention layers (l), and for each attential layer of the attention layers (l), a term ($\mathcal{L}_{kq}^{1l}$, $\mathcal{L}_{kq}^{2l}$, $\mathcal{L}_{kq}^{3l}$) that characterizes the sum of attention weights of the attention layer (l) with respect to the position of the adversarial patch in the input image is maximized.

4. The method according to claim 1, wherein the adversarial patch is determined according to a projected gradient descent.

5. The method according to claim 1, further comprising:
mitigating an influence of the determined adversarial patch on the machine learning system.

6. The method according to claim 5, wherein the mitigating of the influence of the adversarial patch on the machine learning system is achieved by adversarial training.

7. A computer-implemented method for determining an adversarial patch for a machine learning system, wherein the machine learning system is configured for image analysis and determines an output signal based on an input image, wherein the output signal is determined based on an output of an attention layer (l) of the machine learning system, the method comprising:

determining the adversarial patch by optimizing the adversarial patch with respect to a loss function, the loss function including a term ($\mathcal{L}_{kq}^{1l}$, $\mathcal{L}_{kq}^{2l}$, $\mathcal{L}_{kq}^{3l}$) that characterizes a sum of attention weights of the attention layer (l) with respect to a position of the adversarial patch in the input image, and maximizing the term, wherein the attention layer includes a plurality of heads, wherein each head of the heads includes attention weights, and the term ($\mathcal{L}_{kq}^{1l}$, $\mathcal{L}_{kq}^{2l}$, $\mathcal{L}_{kq}^{3l}$) that characterizes the sum of attention weights of the attention layer (l) with respect to the position of the adversarial patch in the input image is maximized for each head of the attention layer (l) wherein maximizing the term ($\mathcal{L}_{kq}^{1l}$, $\mathcal{L}_{kq}^{2l}$, $\mathcal{L}_{kq}^{3l}$) for each head is achieved by maximizing a loss function characterized by the formula:

$$\mathcal{L}_{kq}^{l} = \log\sum_{h} e^{\mathcal{L}_{kq}^{hl}}.$$

8. A computer-implemented method for determining an adversarial patch for a machine learning system, wherein the machine learning system is configured for image analysis and determines an output signal based on an input image, wherein the output signal is determined based on an output of an attention layer (l) of the machine learning system, the method comprising:

determining the adversarial patch by optimizing the adversarial patch with respect to a loss function, the loss function including a term ($\mathcal{L}_{kq}^{1l}$, $\mathcal{L}_{kq}^{2l}$, $\mathcal{L}_{kq}^{3l}$) that characterizes a sum of attention weights of the attention layer (l) with respect to a position of the adversarial patch in the input image, and maximizing the term, wherein the machine learning system includes a plurality of attention layers (l), and for each attential layer of the attention layers (l), a term ($\mathcal{L}_{kq}^{1l}$, $\mathcal{L}_{kq}^{2l}$, $\mathcal{L}_{kq}^{3l}$) that characterizes the sum of attention weights of the attention layer (l) with respect to the position of the adversarial patch in the input image is maximized wherein the terms ($\mathcal{L}_{kq}^{1l}$, $\mathcal{L}_{kq}^{2l}$, $\mathcal{L}_{kq}^{3l}$) are maximized by maximizing a loss function characterized by the formula:

$$\mathcal{L}_{kq}^{hl}\mathcal{L}_{kq}^{l} = \log\sum_{h} e^{\mathcal{L}_{kq}^{hl}}.$$

9. A computer-implemented method for determining a control signal, the control signal being configured to control an actuator of a technical system, the method comprising:

mitigating an influence of an adversarial patch on a machine learning system, the machine learning system being configured for image analysis and determines an output signal based on an input image, wherein the output signal is determined based on an output of an attention layer (l) of the machine learning system, the adversarial patch being determined by optimizing the adversarial patch with respect to a loss function, the loss function including a term ($\mathcal{L}_{kq}^{1l}$, $\mathcal{L}_{kq}^{2l}$, $\mathcal{L}_{kq}^{3l}$) that characterizes a sum of attention weights of the attention layer (l) with respect to a position of the adversarial patch in the input image, and maximizing the term; and determining the control signal based on an output of the machine learning system, wherein the term ($\mathcal{L}_{kq}^{1l}$, $\mathcal{L}_{kq}^{2l}$, $\mathcal{L}_{kq}^{3l}$) is characterized by the formula:

$$\mathcal{L}_{kq}^{hl} = \frac{1}{n}\sum_{j} B_{ji^*}^{hl}, \quad B^{hl} = \frac{P_Q^{hl}(P_K^{hl})^T}{\sqrt{d_k}}.$$

10. A training system configured to train a machine learning system, the machine learning system is configured for image analysis and determines an output signal based on an input image, wherein the output signal is determined based on an output of an attention layer (l) of the machine learning system, the training system configured to:

determine the adversarial patch by optimizing the adversarial patch with respect to a loss function, the loss function including a term ($\mathcal{L}_{kq}^{1l}$, $\mathcal{L}_{kq}^{2l}$, $\mathcal{L}_{kq}^{3l}$) that characterizes a sum of attention weights of the attention layer (l) with respect to a position of the adversarial patch in the input image, and maximizing the term; and mitigate the influence of the adversarial patch on the machine learning system by adversarial training, wherein the term ($\mathcal{L}_{kq}^{1l}$, $\mathcal{L}_{kq}^{2l}$, $\mathcal{L}_{kq}^{3l}$) is characterized by the formula:

$$\mathcal{L}_{kq}^{hl} = \frac{1}{n}\sum_{j} B_{ji^*}^{hl}, \quad B^{hl} = \frac{P_Q^{hl}(P_K^{hl})^T}{\sqrt{d_k}}.$$

11. A non-transitory machine-readable storage medium on which is stored a computer program for determining an adversarial patch for a machine learning system, wherein the machine learning system is configured for image analysis and determines an output signal based on an input image, wherein the output signal is determined based on an output of an attention layer (l) of the machine learning system, the computer program, when executed by a processor, causing the processor to perform the following:

determining the adversarial patch by optimizing the adversarial patch with respect to a loss function, the loss function including a term ($\mathcal{L}_{kq}^{1l}$, $\mathcal{L}_{kq}^{2l}$, $\mathcal{L}_{kq}^{3l}$) that characterizes a sum of attention weights of the attention layer (l) with respect to a position of the adversarial patch in the input image, and maximizing the term, wherein the term ($\mathcal{L}_{kq}^{1l}$, $\mathcal{L}_{kq}^{2l}$, $\mathcal{L}_{kq}^{3l}$) is characterized by the formula:

$$\mathcal{L}_{kq}^{hl} = \frac{1}{n}\sum_{j} B_{ji^*}^{hl}, \quad B^{hl} = \frac{P_Q^{hl}(P_K^{hl})^T}{\sqrt{d_k}}.$$

* * * * *